W. D. GOZA.
BUMPER WHEEL LOCK.
APPLICATION FILED NOV. 28, 1916.
1,241,961. Patented Oct. 2, 1917.
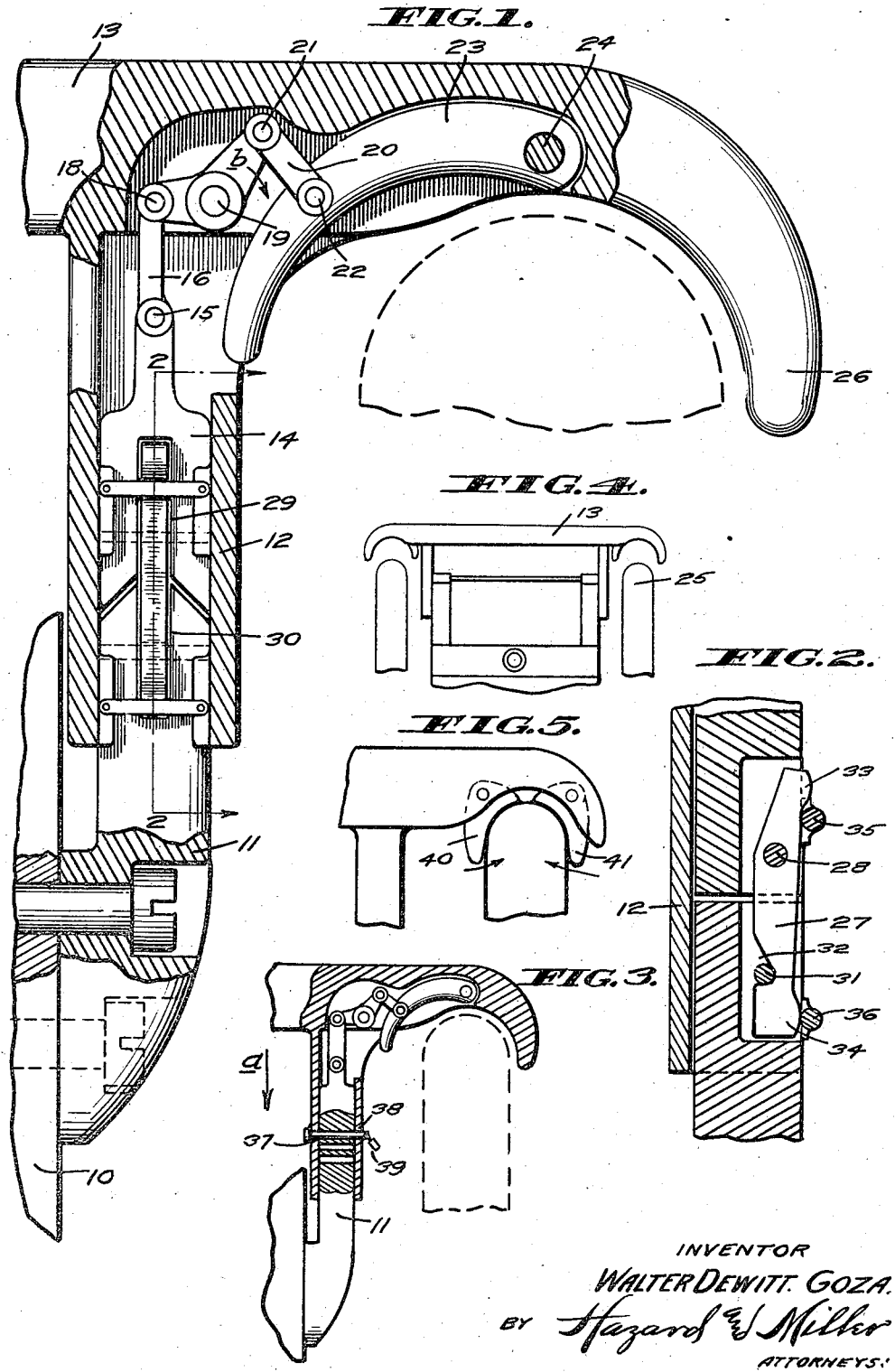
INVENTOR
WALTER DEWITT GOZA.
BY Hazard & Miller
ATTORNEYS.

_UNITED STATES PATENT OFFICE._

WALTER D. GOZA, OF LOS ANGELES, CALIFORNIA.

BUMPER WHEEL-LOCK.

1,241,961.     Specification of Letters Patent.     Patented Oct. 2, 1917.

Application filed November 28, 1916. Serial No. 133,940.

*To all whom it may concern:*

Be it known that I, WALTER DEWITT GOZA, a citizen of the United States, residing at Los Angeles, in the county of Los Angeles and State of California, have invented new and useful Improvements in Bumper Wheel-Locks, of which the following is a specification.

This invention relates to a lock for automobiles and particularly pertains to a wheel lock for the front wheels thereof.

It is an object of this invention to provide a lock which may be incorporated within the bumper design to engage and lock the front wheels of an automobile against rotation.

Another object of this invention is to provide an automobile lock which will act as an emergency brake for the automobile and will grip the front wheels of the vehicle when the bumper encounters an obstacle.

Another object of this invention is to provide an automobile lock which may be locked in an intermediate position so that the wheels will rotate but may not be deviated from a direct course of travel, thus providing a lock which will comply with the ordinances in most cities requiring that an automobile may be removed from its standing place in case of fire or accident.

It is a further object to provide an automobile lock which is simple in its construction and may be positively actuated and locked to produce the above results.

Other objects will appear hereinafter.

The invention is illustrated (by way of example) in the accompanying drawings, in which Figure 1 is an enlarged view in detail, illustrating one of the locking elements and further disclosing its relation to the vehicle frame and its mounting upon the vehicle.

Fig. 2 is a view in longitudinal cross-section particularly disclosing the construction by which lost motion may be provided and the bumpers adapted to accommodate vehicles of various design.

Fig. 3 is a view in section and elevation illustrating a modified form of the invention not provided with the lost motion arrangement as incorporated within the previous figures.

Fig. 4 is a view in diagram illustrating the complete bumper and its relation to the vehicle wheels.

Fig. 5 is a fragmentary view in plan illustrating a modification in the jaw construction and a means of automatic operation.

Referring more particularly to the drawings, 10 indicates one of the frame side members of a vehicle, upon which is secured a fixed standard 11. This standard lies in the same horizontal plane as the vehicle frame and extends forward therefrom. The forward end of the standard is rectangular in cross section and is adapted to slidably fit a lock housing 12; this housing in form is integral with the cross bar 13 of the bumper and includes the locking mechanism with which the present invention is concerned.

The lock mechanism as disclosed in Fig. 1 of the drawings comprises a horizontal slidable actuating bolt 14, which is fitted at its forward end with a pivot pin 15 adapted to pivotally engage a link 16. This link extends toward the bumper and is held in pivotal engagement with a bell crank 17 by means of a pivot pin 18, the bell crank 17 being mounted for oscillating movement upon a shaft 19 incorporated within the bumper construction. The opposite lock of the bell crank extends forwardly and engages a jaw link 20 by means of a pivot pin 21. This jaw link is in turn secured by pivot pin 22 to a locking jaw 23, held upon a pin 24, which is disposed in substantially horizontal alinement with the center of one of a pair of front wheels 25. The locking mechanism as described is entirely housed within the housing and a portion of the transverse section of the bumper. The locking jaw 23, however, is permitted to swing in and out from the housing and to engage the inner side of the vehicle tire. The outer side of the vehicle tire is engaged by a bumper horn 26, which is arcuate in shape and is designed to substantially conform to the sectional contour of the tire.

Reference being had to Fig. 1 of the drawing, it will be seen that the standard 11 and the lock 14 are separately mounted within the bumper housing and are provided with a lost motion mechanism which will permit the bumper to be mounted upon vehicles of various designs without alteration of the parts involved. This mechanism consists of a double acting pawl 27, which is pivotally secured by a pin 28 in a longitudinally extending slide 29 formed along the center of the lock bolt 14. The pawl extends rearwardly from this slide and when the two parts are adjacent each other will extend into a similar slide 30, formed in the forward end of the standard 11. A trip pin 31 bridges the slide 30 and is adapted under some circumstances to engage a tooth 32 formed upon the under side of the pawl. The back of the pawl is formed with cam faces 33 and 34, which are disposed at opposite ends of the pawl and alternately encounter actuating bars 35 and 36 respectively, by which the mechanism is positively actuated without the use of springs.

Reference being had to Fig. 3, it will be seen that the standard 11 is formed with an extension corresponding to the lock bolt 14, and that movement of the bumper in the direction indicated by the arrow —a— will cause the entire standard to advance through the lock housing, in this manner directly and instantly actuating the lock mechanism. In order to show means for locking the bumper in a desired position, a series of three transverse holes 37 are formed through the standard and adapted to be brought to successively register with complementary holes formed through the opposite walls of the lock housing. This arrangement is provided to permit a lock bolt 38 to extend through the housing wall and one of these holes to lock the bumper and the locking jaw in a desired position. A padlock 39 is provided to hold the bolt in its place. This arrangement, however, may be changed and other and more convenient locking means substituted without departing from the spirit of the invention.

In operation the bumper is normally positioned as shown in Fig. 4 of the drawings, and preferably is spaced a distance of approximately 2 inches ahead of the periphery of the front wheels. When in this position the lock housing is drawn to its foremost position in relation to the bolt 11, this in turn exerting a pull on the link 16 which is transmitted through the bell crank 17 to the lock jaw 23 and draws the locking jaw toward the bumper and away from vehicle wheel. This condition is identical in both the preferred and modified form of the invention as disclosed in Figs. 1 and 3 respectively. However, in the mechanism disclosed in Fig. 1, the actuating bar 35, will pass over the cam face 33 upon the pawl 27 and act to raise the cam to release the tooth 32 of the pawl from engaging with the pin 31, after which the bumper may be drawn ahead as far as desired. When an obstacle is encountered by the bumper, the force will be transmitted to move the bumper rearwardly and slide it along the uprights 11. In the construction illustrated in Fig. 1, considerable movement will take place before the locking mechanism will be actuated. This is due to the fact that the upright 11 has been drawn out of engagement with the locking bolt 14 and stands in spaced relation thereto. As the bumper moves rearwardly the adjacent ends of the upright and bolt 14 will abut against each other, and thereafter the mechanism will be actuated. Simultaneously with this action the cam face 34 of the pawl will pass beneath the actuating pin 36 and force the pawl down into engagement with the locking pin 31, where it will remain until actuation is effected by the cam face 33 and pin 35 as previously described.

The advance movement of the standard 11 through the lock housing will act to force the link 16 forward and rotate the bell crank in the direction indicated by the arrow —b—. This rotation will effect movement through the link 20 to swing the locking jaw 23 toward the tire as the bumper itself approaches the tire, and as the operation proceeds the locking jaw 23 and the horn of the bumper 26 will co-act to positively grip the opposite sides of the tire and brake the wheel against rotation, thus effectively applying an emergency brake when desired.

The action to permanently lock the wheels by means of the bolt 38 and the lock 39 will be the same as that previously described, as the bumper will be manually forced on to the standards 11 and caused to grip the wheel by means of its jaws.

When it is desired to immovably lock the wheel, the bolt 38 is positioned through the rear opening 37 and will thus hold the wheel in a viselike grip. When it is desired to lock the wheels in a straight ahead position and yet permit them to be rotated, the bolt is passed through the middle opening 37 and will maintain the jaws in a position to limit the swinging movement of the wheels.

In the modified form illustrated in Fig. 5 jaws 40 and 41 are formed with actuating extensions adapted to be encountered by the tire as the bumper moves rearwardly and this will cause the jaws to automatically bind the tire without the use of mechanism.

It will thus be seen that the combined bumper and lock here disclosed, will act in a simple manner to retard the movement of the vehicle in emergency cases, confine the vehicle to a straight path of travel when so desired, or positively lock the vehicle against movement, by means of a positively and easily operated mechanism.

While I have shown the preferred construction of my lock as now known to me, it will be understood that various changes in the combination, construction and arrangement of parts may be made by those skilled in the art, without departing from the spirit of my invention.

I claim:

1. In a combined bumper and lock for automobiles the combination with a vehicle frame of wheels mounted for rotation thereunder, a bumper bar disposed transversely of said frame and mounted thereon, a locking mechanism incorporated within the bumper construction and including jaws adapted to forcefully grip the wheels of said vehicle, and means whereby movement of the bumper toward the vehicle frame will act to draw the gripping jaws in engagement with the vehicle tires and thereafter draw said jaws toward each other in a manner to positively grip said tires.

2. In a combination bumper and lock for automobiles the combination with a vehicle frame of wheels mounted for rotation thereunder, a bumper bar disposed transversely of said frame and mounted thereon, a locking mechanism incorporated within the bumper construction and including jaws adapted to forcefully grip the wheels of said vehicle, means whereby movement of the bumper toward the vehicle frame will act to draw the gripping jaws in engagement with the vehicle tires and thereafter draw said jaws toward each other in a manner to positively grip said tires, and means whereby said jaws may lock in their gripped position.

3. In a combined bumper and lock for automobiles the combination with a vehicle frame of vehicle wheels rotatably mounted thereupon, a transversely disposed bumper bar positioned in front of said frame and said wheels, a fixed gripping jaw formed integral with said bumper bar and adapted to conform to the outer contour of the tire upon said vehicle wheels, a movable inner gripping jaw adapted to be swung toward said outer jaw in a manner to engage and grip said tire, an actuating mechanism whereby movement of the bumper bar toward the vehicle frame will swing said movable jaw toward the tire, means whereby said movement of actuation may be delayed until a given point has been reached along the inward travel of said bumper bar, and means whereby said lock jaw may be positively locked in a desired position in relation to said wheel.

4. In a combined bumper automobile lock the combination with a vehicle frame having vehicle wheels mounted thereupon, a bumper mounted on said frame transversely thereof and disposed in front of said wheels, an outer arcuate horn formed at the end of said bumper and adapted to conform to the contour of a tire mounted upon the vehicle wheel, a movable locking jaw adapted to conform to the opposite side of said tire and co-act with the horn to grip the tire, a locking standard upon which said bumper is slidably mounted in relation to the frame, means whereby the movement of the bumper toward the frame will cause the standard to actuate the locking jaw, and means whereby said horn and locking jaw may positively lock in a fixed relation to each other so that the vehicle wheel engaged thereby will be positively locked against rotation and confined against pivotal movement.

5. An automobile bumper and wheel lock, comprising a bumper bar extending transversely of the automobile frame and mounted thereon, complementary pairs of jaws mounted at the opposite ends of said bumper bar, and means whereby movement of the bar toward the frame will cause the jaws to close in upon and grip the tires of the wheels of said automobile.

In testimony whereof I have signed my name to this specification.

WALTER D. GOZA.

Copies of this patent may be obtained for five cents each, by addressing the "Commissioner of Patents, Washington, D. C."